United States Patent
Qu et al.

(10) Patent No.: US 7,115,546 B2
(45) Date of Patent: *Oct. 3, 2006

(54) ACID DIVERTING SYSTEM CONTAINING QUATERNARY AMINE

(75) Inventors: Qi Qu, Spring, TX (US); David Alleman, Houston, TX (US)

(73) Assignee: BJ Services Company, Houston, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/356,210

(22) Filed: Jan. 31, 2003

(65) Prior Publication Data

US 2004/0152604 A1 Aug. 5, 2004

(51) Int. Cl.
*C09K 8/60* (2006.01)

(52) U.S. Cl. ............ 507/236; 507/215; 507/216; 507/214; 507/240; 507/222; 507/268; 507/269; 507/277; 166/282

(58) Field of Classification Search ........... 507/214, 507/215, 216, 240, 222, 236, 268, 269, 277
See application file for complete search history.

(56) References Cited

U.S. PATENT DOCUMENTS

| | | | |
|---|---|---|---|
| 3,580,853 A | 5/1971 | Parran | |
| 3,794,117 A | 2/1974 | Knox | |
| 4,061,580 A | 12/1977 | Jahnke | |
| 4,113,631 A | 9/1978 | Thompson | |
| 4,695,389 A | 9/1987 | Kubala | |
| 4,725,372 A | 2/1988 | Teot | |
| 4,735,732 A | 4/1988 | Clapper | |
| 4,767,463 A * | 8/1988 | Brode et al. | 106/162.2 |
| 4,913,743 A * | 4/1990 | Brode et al. | 106/162.2 |
| 4,960,821 A * | 10/1990 | Peiffer | 524/534 |
| 5,112,603 A | 5/1992 | Nadolsky et al. | |
| 5,238,627 A | 8/1993 | Matsuhisa | |
| 5,342,530 A | 8/1994 | Aften et al. | |
| 5,529,122 A | 6/1996 | Thach | |
| 5,663,123 A * | 9/1997 | Goodhue et al. | 507/225 |
| 5,710,109 A | 1/1998 | Surles | |
| 5,908,617 A * | 6/1999 | Moore et al. | 424/70.19 |
| 5,979,557 A | 11/1999 | Card | |
| 6,046,140 A | 4/2000 | Woo | |
| 6,194,356 B1 * | 2/2001 | Jones et al. | 507/225 |
| 6,274,645 B1 | 8/2001 | Gundlach et al. | |

(Continued)

FOREIGN PATENT DOCUMENTS

EP 0130732 A 9/1985

(Continued)

OTHER PUBLICATIONS

Scott M. McCarthy, et al., *The Successful Use of Polymer-Free Diverting Agents for Acid Treatments in the Gulf of Mexico*, Feb. 20-21, 2002 (presented at Society of Professional Engineers Inc. International Symposium and Exhibition on Formation Damage Control in Lafayette, Louisiana) (SPE 73704).

Primary Examiner—Philip C. Tucker
(74) Attorney, Agent, or Firm—Jones & Smith, LLP; John Wilson Jones

(57) ABSTRACT

A process for stimulating a formation is disclosed wherein a diverting fluid is used to divert an acid treatment package from a high permeability or damaged portion of a formation to a low permeability or undamaged portion of a formation. The fluid, which preferably forms vesicles, comprises at least one surfactant, at least one quaternary amine polyelectrolyte, water, and a non-aqueous solvent.

47 Claims, 10 Drawing Sheets

U.S. PATENT DOCUMENTS

| | | |
|---|---|---|
| 6,306,800 B1 | 10/2001 | Samuel |
| 6,399,546 B1 | 6/2002 | Chang |
| 6,410,489 B1 | 6/2002 | Zhang |
| 6,432,885 B1 | 8/2002 | Vollmer |
| 6,509,301 B1 | 1/2003 | Vollmer |
| 6,767,869 B1* | 7/2004 | DiLullo et al. .............. 507/244 |
| 6,770,607 B1* | 8/2004 | Chen et al. ................. 510/158 |
| 6,810,959 B1* | 11/2004 | Qu et al. .................... 166/300 |
| 6,840,318 B1* | 1/2005 | Lee et al. ................... 166/293 |
| 2002/0132741 A1 | 9/2002 | Chang |
| 2002/0193257 A1* | 12/2002 | Lee et al. ................... 507/200 |
| 2003/0114315 A1 | 6/2003 | Schwartz et al. |
| 2003/0134751 A1* | 7/2003 | Lee et al. ................... 507/200 |
| 2003/0139298 A1 | 7/2003 | Fu et al. |
| 2003/0158269 A1 | 8/2003 | Smith et al. |
| 2003/0234103 A1* | 12/2003 | Lee et al. ................... 166/293 |
| 2004/0035538 A1* | 2/2004 | Kokko ........................ 162/158 |
| 2004/0072698 A1* | 4/2004 | Zaroslov et al. ............ 507/200 |
| 2004/0097385 A1* | 5/2004 | Chen et al. ................. 510/130 |

FOREIGN PATENT DOCUMENTS

| | | |
|---|---|---|
| WO | WO 0132741 A1 | 5/2001 |
| WO | WO 2002183946 A1 | 11/2001 |
| WO | WO 200218745 A2 | 3/2002 |
| WO | WO 200218745 A3 | 3/2002 |

* cited by examiner

ACID DIVERTING SYSTEM CONTAINING QUATERNARY AMINE

FIELD OF THE INVENTION

This invention relates to viscoelastic surfactant based acid diverting fluids which contain a quaternary amine polyelectrolyte and a method of using such diverters to enhance the productivity of a hydrocarbon-bearing formation. In a preferred embodiment, the invention relates to the use of such viscoelastic fluids in matrix acidizing. In addition, the viscoelastic fluids of the invention can be used in the fracturing of subterranean formations, such as the formation surrounding oil or gas wells, as well as sand control completion.

BACKGROUND OF THE INVENTION

Matrix acidizing, the process of injecting a formation stimulation fluid such as acid or other acid-forming materials that may react with minerals in the formation to increase the formation permeability, is a common method used to stimulate and enhance the production of hydrocarbons from a hydrocarbon producing formation and remove formation damage caused by drilling mud invasion and clay migration.

For most matrix acid treatments, acid is injected into the reservoir below or above fracturing rates and pressures. To obtain the maximum benefits of matrix acidizing, it is often desirable to treat the entire productive interval of the formation with the stimulation fluid. As the stimulation fluid is pumped, it will preferentially enter the interval of least resistance (lowest stress) or highest permeability and will react with the formation material and open additional flow paths. As a result, the high permeability interval or non-damaged zone receives most or all of the stimulation while the desired low permeability or damaged zones do not receive the desired stimulation. In most cases, the low permeability or damaged zone is the portion of the reservoir that will benefit the least from stimulation. Without proper diversion, the acid, by flowing to the higher permeability zone, leaves the low permeability zone untreated.

Acid treatment is further used to remove formation damage. Standard sand control treatments often use high rate water packs. Before or after placement of gravel with a completion fluid, low-density brine or a linear gel, a large acid treatment is typically pumped to remove the near wellbore formation damage or high skins encountered in perforation wells. Thus, a clay acid package is often pumped into the formation before the gravel pack to stabilize the residual clay. The results of these treatments are often directly related to the ability of the acid to remove the near-wellbore damage and connect the wellbore to the formation. In addition to determining the most effective combination of acid blends and volumes for each particular reservoir, treatment design and planning is often performed in order to insure that the acid is placed across the entire interval. Such staging of acid treatment across the entire interval further serves to treat the damaged clean portion of the sands.

The successful acid placement in matrix treatments of open hole horizontal wells is even more difficult due to the length of the zone treated and potential variation of the formation properties. A successful diversion technique is critical to place the acid to the location where damage exists. For an ideal acid treatment on a long heterogeneous reservoir, one would prefer the majority of the acid to be injected into damaged or low permeability intervals; the minimum amount of acid being spent in the clean or undamaged reservoir. However acid, a nonviscous fluid, enters into the region with the lowest stress contrast which unfortunately is typical of the cleanest interval or the partially depleted sand. In order to re-direct the stimulation fluids from the non-damaged intervals into the damaged intervals, a pressure differential across the high permeability or non-damaged intervals is preferably created. This pressure differential typically forces the stimulation fluid into new portions of the reservoir that otherwise would not receive the stimulation fluid. Until a sufficient pressure differential is built up in this region, the fluid continues to be injected into the high permeability zones of the interval.

In light of such difficulties, operators and service companies typically attempt to stagger the introduction of acid fluid into damaged intervals. Such methodology more effectively treats all of the requisite intervals. In conjunction with the acid staging of the acid volumes, diverter stages are often pumped to temporarily "plug" the zones that are taking the acid. Rate increases during the treatment to increase injection pressure and cause diversions also are often attempted. Depending on the formation condition, various diverting techniques, such as particulate diverting agents, or viscous acids, have been used both successfully and unsuccessfully in gravel pack and stimulation treatments for numerous years. With many options of chemical diverting or bridging agents available, the type of product used varies from application to application and in some causes may even cause formation damage by the chemical residues. Previous works also established the model and practice to control the pumping rate was to achieve the desired diversion.

The overall success or failure of many acid treatments is often judged by the ability to inject or direct the acid into the damaged or lower permeability zone. Without good diversion, the results of the acid treatment often lead to either incomplete damage removal and/or requirements for uneconomical volumes of treatment fluids. A well developed diverting agent, without formation damage after the treatment, is critical to the success of any matrix acid stimulation treatment and successful sand control completion.

Chemical diverting agents attempt to temporarily block the high permeability interval and divert the stimulation fluids into the desired low permeability or damaged intervals. It is desirable for these viscous gels to be stable at the bottom hole temperature and also to be removable from the formation rapidly after the treatment in order to eliminate any potential damage to the high permeability intervals. One chemical diverting fluid is a gelled hydroxyethylcellulose (HEC) pill. This technique relies upon the viscosity of the pill to influence the injection pressure of the interval it enters. As the pill enters the formation, the viscosity of the pill will restrict the injection of other fluids into this area. As the injection pressure increases within this portion of the interval, other sections of the interval will break down and begin accepting fluid. This technique is severely limited if the temperature of the gelled HEC exceeds 200° F. Above this temperature, the base viscosity and life of the pill is greatly decreased. Another problem seen with gelled HEC is that the blocked zone may be damaged from the polymeric residues left inside the porous media once the acid treatment is completed.

Foams may also be used as a diverting method for acid stimulation. Foams typically are generated through a blend of surfactants and/or a polymer. One of the popular diverting techniques in gravel packing and stimulation is the use of a foamed KCl or $NH_4Cl$ or a gelled HEC pill. When a fluid with high viscosity enters into the high perm zone which restricts the injection of other fluids into the same zone, the injection pressure will begin to increase. As the overall injection pressure increases and overcome the pressure threshold, the relatively low perm sections of the interval begin accepting the injected fluid. This technique is severely limited by temperature due to the instability of most foamed or gelled pills above 200° F. Above this temperature the base viscosity of the pill will be greatly decreased and the life of the pill also affected.

Another problem associated with the foamed or gelled diverters is the lack of effectiveness in extremely high permeability reservoirs (>500 mD). Foamed or gelled HEC pills will have little effect in high permeability reservoirs due to the ability of the formation to allow for "leak-off" of such fluids. Properly sized particles such as silica flour, calcium carbonate, or organic resins, with the ability to effectively pass through the gravel or perforations but plate or "bridge off" on the formation face have been introduced in these environments. Even combinations of HEC diversion agents, nitrogen, and oil-soluble resins have been field tested. The main problems associated with the solid particles may be the improper sizing causing deep invasion problems that may not readily "clean-up" and cause further damage.

The addition of the polymer may also cause formation damage, as described above, while the use of nitrogen gas tanks and other associated pumping equipment are typically required for foam used as acid stimulation diverting agent. This may not be practical in many cases, especially for offshore acid treatments, as the operation is often limited by available deck space on the rig or vessel. In addition, foams typically become unstable above 250° F.

Another type of viscous fluid diverting agent used to assist in formation stimulation is a surfactant or surfactant mixture. One such viscoelastic fluid forms micelles. These wormlike micelles are sensitive to hydrocarbons. By utilizing this sensitivity, the fluid may selectively block water-bearing zones while the hydrocarbon-bearing zone is unaffected. However, this viscoelastic surfactant fluid typically cannot discriminate between zones with various permeabilities as long as the zones are hydrocarbon-bearing. Further, unlike polymer based fluids which rely upon filter cake deposition to control leak-off to the formation, viscoelastic surfactant diverting agents control fluid leak-off into the formation through the structure size of the micelles. The micellar based VES fluids usually have high leak-off rates to the formation due to the small size of the wormlike micelles. Rapid weaving and breaking of these structures also limits the ability of the micellar based viscoelastic system to control fluid leak-off. The temperature limitations for such a system is generally around 200° F. due to the low stability of micellar structure.

With every type of diverting system available currently, clean-up only occurs with the inclusion of some type of outside source. Time, temperature, and interaction with either reservoir fluids or hydrocarbons is required to remove the diverting agent in place. For example, a viscoelasctic surfactant acid diverters typically require contact with the liquid hydrocarbon during flowback. Without this interaction the very thing that prevents fluids from entering a certain portion of the reservoir may also inhibit the ability of the reservoir to produce hydrocarbons.

In summary, the success of a stimulation treatment or gravel packed completion is often dependent on the ability of the diverting agent to force the acid treatment into different portions of the reservoir. A need therefore exists for a method for diverting the stimulation fluid from high permeability zones to desired low permeability zones by a method which avoids the shortcomings of the prior art. This method should preferably use a composition that does not damage the formation, and is easily removed from the formation.

SUMMARY OF THE INVENTION

The diverting fluids of the present invention overcome the disadvantages of the prior art by providing non-damaging methods for diverting acid stimulating fluids to the low permeability or damaged intervals adjacent to the high permeability or non-damaged intervals. The diverting fluid contains a surfactant, such as an amphoteric surfactant, water, a non-aqueous solvent and a quaternary amine polyelectrolyte. The viscoelastic diverting fluid of this invention does not cause formation damage.

The viscoelastic surfactant diverting fluid of the invention preferably comprises densely packed surfactant aggregations, called vesicles. The inclusion of the polyelectrolyte facilitates the formation of the vesicles and reduces the need for high levels of surfactant. Further, the addition of the polyelectrolyte enhances thermal stability of the fluid.

The rheological properties of the diverting fluid of the invention may be adjusted by varying the pH of the fluid, concentration of surfactant, temperature during usage of the fluid and selection of the polyelectrolyte.

In another embodiment of the present invention, a process for stimulating a formation is described. An acid stimulation package is injected into the formation, followed by the optional pumping of a spacer fluid. The diverter fluid is then injected into the formation. The diverter fluid contains a surfactant, non-aqueous solvent, water, quaternary amine polyelectrolyte and, optionally, an internal breaker. The pH of the diverting fluid is then reduced. A second acid stimulation package is then injected into the formation. The diverter fluid is injected into the large pore throat portion of the formation as well as the small pore throat portion of the formation. The small pore throat invasion depth of the diverting fluid is less than the large pore throat invasion depth. The process may further include the addition of an internal breaker package to break the surfactant gel and reduce the fluid viscosity to water. This system does not require contact with formation fluids, brines, or acids for clean up to provide optimum production.

In yet another embodiment of the invention, a process for injecting a diverting fluid into a formation is described. The injection is carried out at a pressure lower than the fracture pressure of the formation.

The average viscosity maintained by the diverting fluid is more than 100 cp @ 100 s$^{-1}$ from ambient temperature to about 300° F. Another significant advantage of the viscoelastic fluid of the invention is its response to low pH fluid, such as acid. The prior art micellar systems relied upon interaction with hydrocarbons or formation fluids to reduce viscosity. In contrast, the viscosity of the viscoelastic fluids of the invention may be decreased at low pH. By controlling the time that the acid-forming agent reduces the pH, the time required for the fluid to lose viscosity can be controlled. The resulting product is a fluid that can be broken at a desired time.

BRIEF DESCRIPTION OF THE DRAWINGS

In order to more fully understand the drawings referred to in the detailed description of the present invention, a brief description of each drawing is presented, in which.

DETAILED DESCRIPTION OF PREFERRED EMBODIMENTS

Figure 1A:
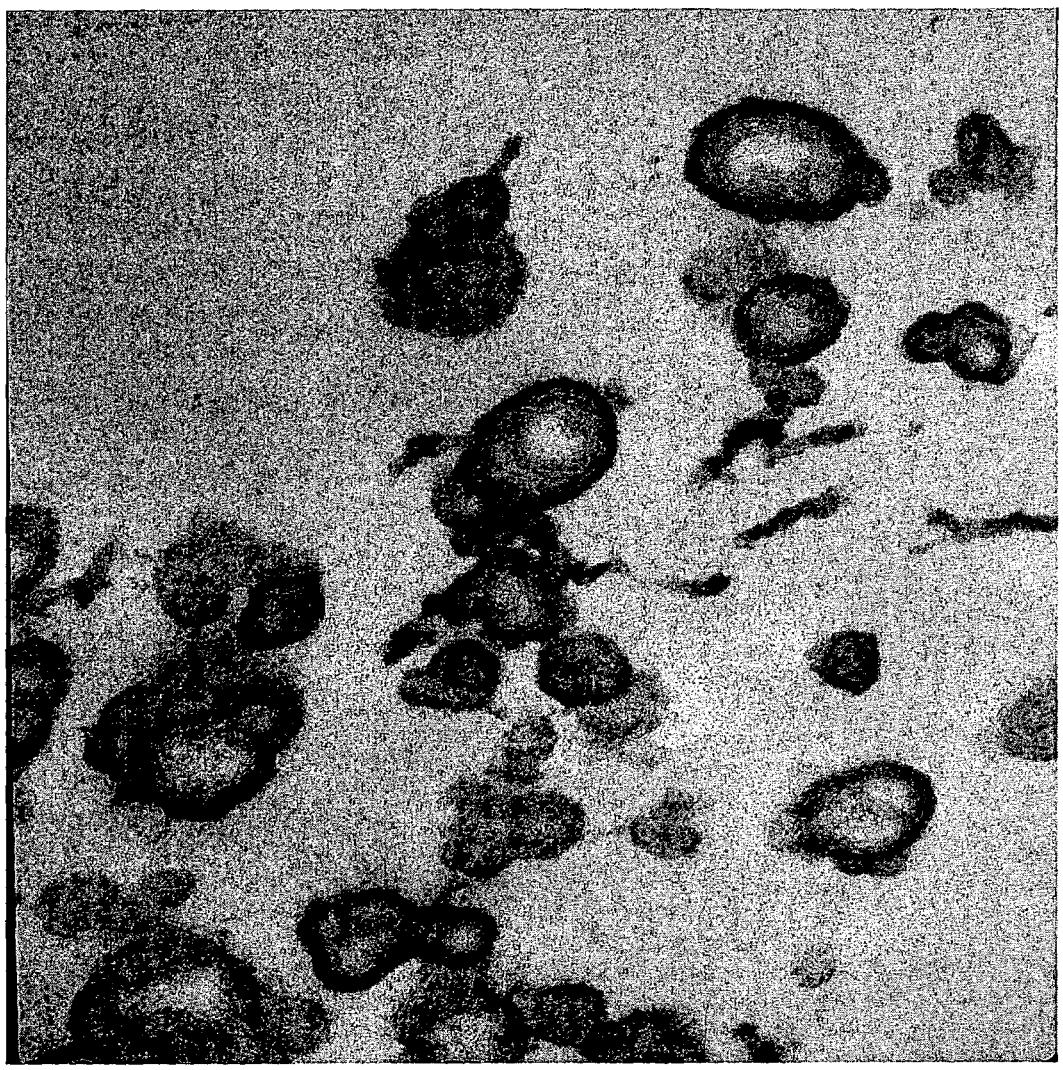
FIG. 1A is a Transmission Electron Microscopy (TEM) image which illustrates the vesicle structure of the inventive viscoelastic surfactant fluids.

The viscoelastic fluid of the invention comprises:
(1) at least one surfactant;
(2) at least one quaternary amine polyelectrolyte;
(3) water, including, but not limited to, sea water or fresh water, and
(4) a non-aqueous solvent.

These components are preferably combined in percentages that are appropriate for the formation to be stimulated.

Generally, the diverting fluid contains surfactant(s) of about 1 to about 50 weight percent, preferably about 1 to about 40 weight percent, and even more preferably about 2 to about 20 weight percent, based upon the weight of the fluid. The polyelectrolyte is generally present in ranges from about 0.05% to about 3.0% weight percent, preferably about 0.1% to about 1% weight percent, and more preferably at about 0.1% to about 0.5% weight percent, based upon the weight of the fluid. The non-aqueous solvents are generally present in ranges from about 0.1 to about 25 weight percent, preferably about 0.5 to about 20 weight percent, and more preferably at about 1 to about 15 weight percent, based upon the weight of the fluid. The remainder weight percent is water.

The quaternary amine polyelectrolyte ("polyquats") are generally soluble in both aqueous and aqueous-alcoholic media. Polyquats include derivatives of cellulose ethers, such as carboxymethyl cellulose. Further, suitable polyquats include aminoalkyl celluloses, aminocarbamoyl celluloses, hydroxyethylcellulose as well as betainized cellulose aminoamides.

Exemplary of such polyquats include those cellulose ether derivatives represented by the overall structural formula:

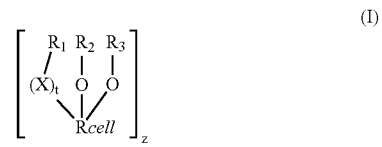

wherein:
$R_{cell}$ is the residue of an anhydroglucose repeat unit, particularly from cellulose;
t is 0 or 1;
X is oxygen;
z is from 50 to about 20,000; and
each $R_1$, $R_2$ and $R_3$ is individually represented by the substituent structural formula:

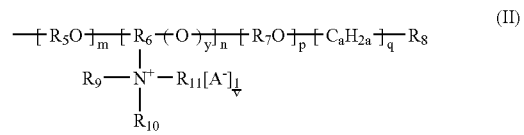

wherein:
$A^-$ is an anion;
a is an integer of from 1 to about 3;
m is an integer of from 0 to about 6;
n is an integer greater than or equal to 0, provided that the level of cationic substitution, CS, defined by the average moles of quaternary nitrogen atoms per mole anhydroglucose repeat unit is greater than 0; preferably n is from 1 to about 25, most 3 to 10, more preferably 3;
p is an integer of from 0 to about 6;
q is 0 or 1;
each $R_5$ and $R_7$ is individually ethylene, a propylene or a hydroxypropylene;
$R_6$ is a di- or trivalent, cyclic, branched or straight chain, saturated or unsaturated hydrocarbon having from 2 to about 6 carbon atoms, provided there are at least 2 carbon atoms between the nitrogen atom and any oxygen atom, such as in the ether substituent or polysaccharide residue;
$R_8$ is hydrogen, hydroxyl, $R_h$, alkyl, carboxyl or alkali metal or amine carboxylate, or other terminal group provided that when q is 0 then $R_8$ is hydrogen or alkyl; $R_8$ is preferably hydrogen or alkyl;
each $R_9$, $R_{10}$ and $R_{11}$ is individually $R_h$, alkyl, aryl, aralkyl, alkaryl, cycloalkyl, alkoxyaryl or alkoxyalkyl, having at least two carbon atoms separating the oxygen atom in the alkoxyaryl or alkoxyalkyl group from the nitrogen atom, or together with $R_6$ forms a heterocyclic ring. Such nitrogen substituents include lower alkyls having from 1 to about 3 carbon atoms, such as methyl, or ethyl; aryls such as phenyl; aralkyls such as benzyl; or, together with $R_6$, dialkyl substituted cycloalkyl such as N,N-dimethyl pyrrolidyl; and the like. Preferred nitrogen substituents of each repeat unit are methyl, a hydrophobic group, or together with $R_6$ provides a pyrrolidyl, or are a mixture of such groups;
$R_h$ is a hydrophobic group containing an alkyl group having at least 8 carbon atoms, preferably from about 10 to about 24 carbon atoms, and most preferably from about 10 to about 18 carbon atoms;
v is equal to the valence of A, preferably 1; and y is 0 or 1, provided that when y is 0 then p and q are 0 and $R_8$ is hydrogen or other terminal group.

In a preferred embodiment, z is from about 100 to about 6,000; and most preferably from about 250 to about 4,000. The corresponding molecular weights of the cationic cellulose ether ranges typically from several thousand up to several million.

Exemplary anions for $A^-$ include inorganic anions such as chloride, bromide, iodide, sulfate, methylsulfate, sulfonate, nitrate, phosphate and the like; and organic anions such as acetate and the like. Monovalent anions are preferred, particularly halides and especially chloride. The anions are typically provided as the residue of the quaternary ammonium salts used as quaternizing agents, or by other known techniques.

The number of quaternary nitrogen atoms per substituent, defined by n in Formula III, is greater than or equal to 0. The extent of quaternization throughout the polysaccharide, characterized as the degree of cationic substitution, i.e., CS, provides an average value per repeat unit which is greater than 0, and in some embodiments is generally less than 1 and preferably from about 0.01 to about 0.6.

Such cellulose ether derivatives of formula (I) are disclosed in U.S. Pat. No. 4,767,463, herein incorporated by reference. In a particularly preferred embodiment, the cellulose ether is polyquaternium-4 represented by the structural formula:

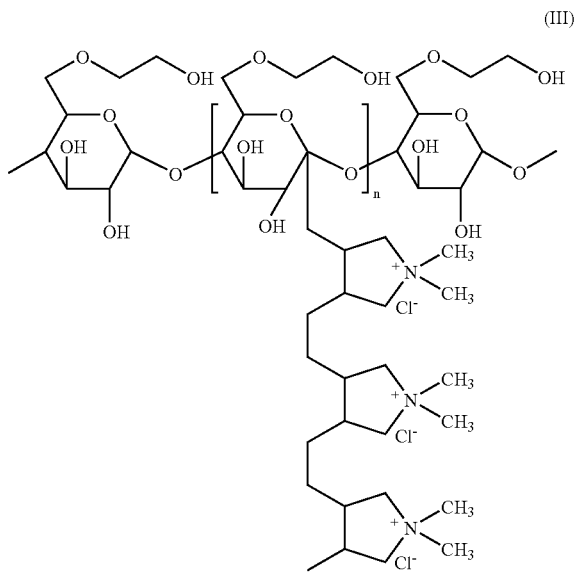

(III)

Polyquaternium-4 or quaternized hydroxyethyl cellulose is manufactured by National Starch and Chemical Corporation under the trademark Celquat. The viscous grade H-100 is especially effective. It is supplied as a granular powder which is soluble in water.

Further preferred polyquats include those of the general formula:

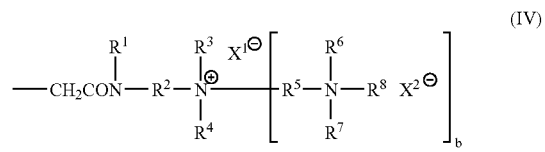

(IV)

wherein
b is between 2 and 8, preferably 4 or 5; and wherein:
$R^1$ is hydrogen or methyl, preferably hydrogen;
$R^2$ is a divalent aliphatic hydrocarbon group with 2 to 20 carbon atoms, preferably —$CH_2$—$CH_2$— or —$CH_2$—$CH_2$—$CH_2$—;
$R^3$, $R^4$, $R^6$, $R^7$ and $R^8$ are alkyl groups with 1 to 4 carbon atoms that may be the same as one another or different from one another, and are preferably each methyl groups;
$R^5$ is a substituted or unsubstituted divalent aliphatic group with 2 to 5 carbon atoms, preferably —$CH_2$—CH(OH)—$CH_2$—; and
$X^1$ and $X^2$ are anions that may be the same as one another or different from one another; preferably a halide, a sulfate ester group, or a sulfonic acid group, most preferably chloride.

Such polyquats are disclosed in U.S. Pat. No. 6,071,505, herein incorporated by reference, and typically may have at least about 0.2 polyquaternary ammonium groups present for each anhydroglucose unit of the polymeric molecule, preferably between about 0.3 and about 0.7 diquaternary groups per anhydroglucose unit, most preferably about 0.5.

Further exemplary polyquats include ammonium derivatives of cellulose ethers, aminoalkyl cellulosics, aminocarbamoyl cellulosic material, hydroxyalkylcellulose as well as betainized cellulose aminoamides The water may be fresh water or salt water. The water may also contain a salt. Useful salts include, but are not limited to, potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

Figure 1B:
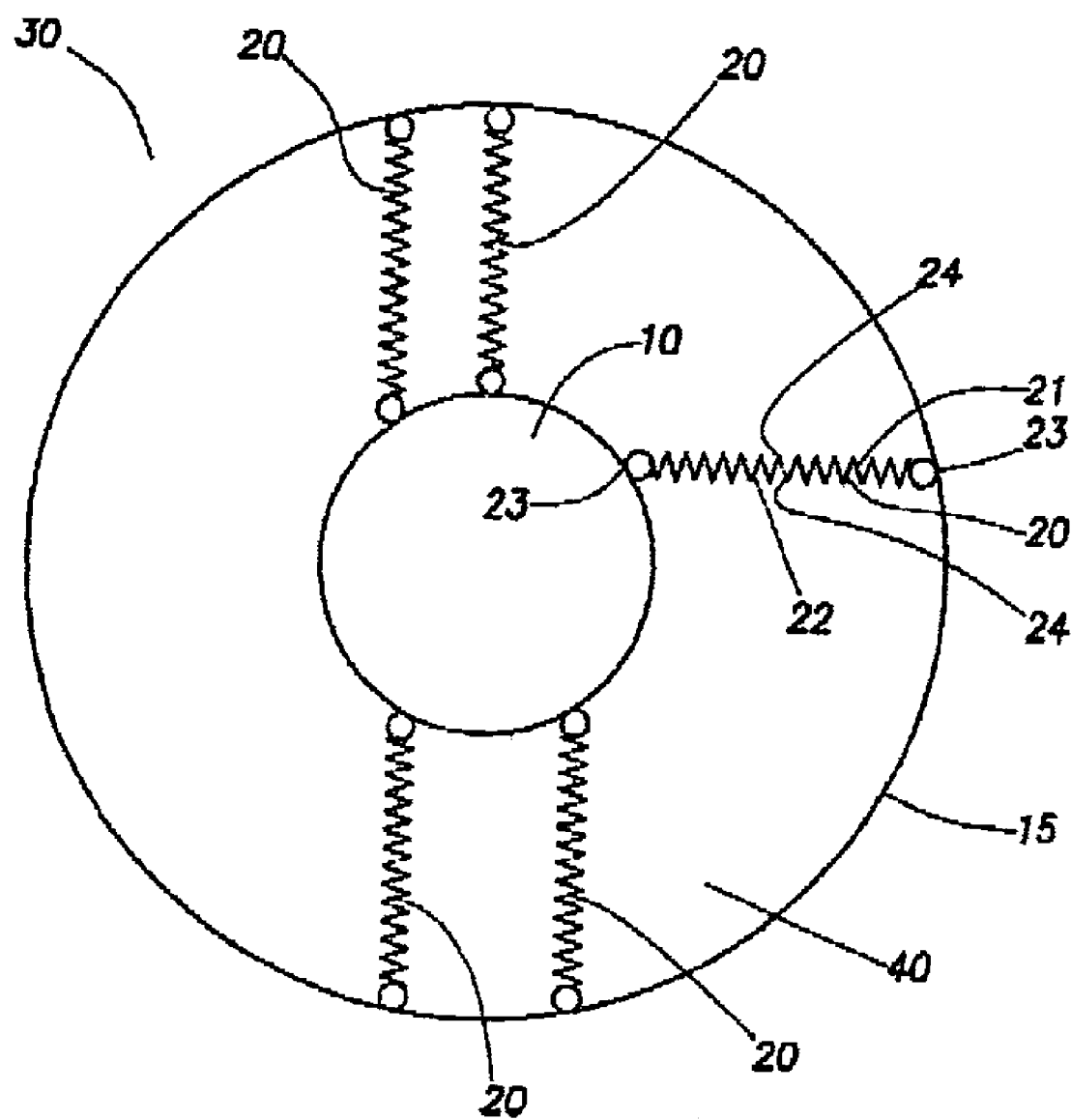
FIG. 1B is an illustration of the vesicular structure of a diverting fluid within the invention.

The viscoelastic fluid of the invention is characterized by its vesicle structure. FIG. 1A is a Transmission Electron Microscopy (TEM) image which illustrates the vesicle structure. Such vesicles are best described as a "water-in-water" emulsion. A schematic drawing of the vesicle 15 is illustrated in FIG. 1B. Vesicle core water 10 lies at the approximate center of the vesicle structure. The surfactant chains 20 have a hydrophilic end 23 and hydrophobic end 24. The surfactant chains 20, composed from at least two surfactant molecules, 21 and 22, are formed from the attraction of hydrophobic ends 24 of the surfactant molecules. At least one hydrophilic end 23 of surfactant chain joins vesicle core water 10. Water 30 surrounds vesicle 15. Among the surfactant chain 20 is non-aqueous solvent 40 that facilitates the structure of the vesicle. The representative vesicle shown in FIG. 1B is unilamellar. A multilamellar vesicle structure is similar in structure, with surrounding water 30 becoming a new core water layer for the next layer of surfactant chains.

The vesicles are classified by the structure of surfactant aggregations in water. Such vesicles provide adequate viscosity for acid diverting purpose and may be characterized as bi-layered aggregates. The diameter of the vesicle generally varies from between about 100 Å to about 50 microns. The size of the aggregation structure of the vesicles is typically much larger than the wormlike micelles. This increase in aggregate structure size creates a much larger surface area. Typically, the vesicle is circular like a ball, in contrast to the wormlike rod-shaped micelles of the prior art. The diameter of the vesicle ball of the invention generally is about the same as the length of the rod-shaped micelles of the prior art. The vesicle structure is also a more stable system than the micellar system and does not continually lose shape and reform over time like the wormlike micelles. Vesicles in a particular system are not necessarily of a uniform size and may have a wide distribution. When the term "vesicle" is used herein it is meant to mean both unilamellar and multilamellar vesicles.

The fluid viscosity for the diverting fluids of the invention may principally be attributed to the vesicular structures aggregated through interaction of surfactant molecules. The surfactant molecules form vesicles through physical interactions and once the physical condition changes, the vesicle structure changes and fluid loses its viscosity.

Many different types of surfactants may be used to form the viscoelastic surfactant diverting fluids. For instance, the mixture of a cationic and an ionic surfactant with water and a non-aqueous solvent will form such a vesicle. Double-tailed surfactants, amphoteric surfactants, and anionic surfactants may also be used. The typical surfactant molecules for this type of fluid are molecules with molecular weight around several hundreds. The surfactant may be chemically or enzymatically modified.

Examples of suitable surfactants include, but are not limited to, imadazoline, alkyl betaine, alkyl amine oxide, phospholipids and lecithin. In a preferred embodiment, the lecithin may be obtained from soybeans. The lecithin may be natural or synthetic lecithin. Preferred phospholipids and lecithin include phosphatidylcholine, phosphatidylethanolamine, and phosphatidylinositol. Additional information on lecithin and its many variants, may be found in Kirk-Othmer Encyclopedia of Chemical Technology, $4^{th}$ ed. Volume 15, pages 192–210, John Wiley & Sons, 1995, Lecithins Sources, Manufacture & Uses, by Bernard F. Szuhaj, American Oil Chemist' Society, 1985 and Lecithins, by Bernard F. Szuhaj and Gary R. List, American Oil Chemists' Society, 1985.

The non-aqueous solvent is typically one or more hydrocarbons and/or halogenated hydrocarbons, although other non-aqueous solvents also function appropriately. Examples of the non-aqueous solvents include, but are not limited to, aliphatic hydrocarbons, aromatic hydrocarbon, alcohols, mineral oils, organic oils such as a soybean oil or a corn oil, fatty acids, glycol ethers, ethers, or mixtures thereof. An example of an alcohol useful in the composition is a linear, branched, or cyclic $C_1$ to $C_{20}$ alcohol, such as a linear or branched $C_4$ to $C_{20}$ alcohol. Examples of these solvents are 2-ethyl hexanol, ethylene glycol, monobutyl ether, ethylene glycol monobutyl, or mixtures thereof.

The diverting fluid may contain other compounds to assist in its function. Examples include, but are not limited to, corrosion inhibitors, fluid loss additives, etc. Such components are present in an amount between from about 0.05% to about 5%, preferably from about 0.05% to about 1%, weight percent of the total weight of the fluid.

In addition, the diverting fluid of the invention may contain a gas such as carbon dioxide or nitrogen, and the like. This diverting fluid preferably contains less than 30% gas by volume, preferably less than 10%, and most preferably less than 5% gas.

Without use of the novel diverting fluids, the stimulating fluid would normally be injected into the portion of formation at the point of least resistance during matrix injection. This portion of the formation is typically associated with the highest permeability or least amount of formation damage. A pressure increase in the high permeability or undamaged portion of the formation or diverting agent would be required to change the injection profile.

Invasion or the leak-off profile of the viscoelastic fluid of the invention is controlled by the size of the surfactant aggregated structure. With the viscoelastic fluids of the invention, the size of the aggregation structure of the system is large. The physical size of the vesicles of the invention are much larger than the prior art wormlike micelles. In particular, the generally ball-shaped vesicles are three-dimensional in contrast to the one-dimensional rod-like micelles of the prior art. The ball-shaped vesicles of the invention are stable and do not continually lose shape and reform over time.

Thus, the vesicles formed by the diverting fluid of the invention render a viscoelastic system having greater ability to control fluid leak-off and invasion. An operator may control leak-off of the stimulating fluid to the formation by controlling the size differential between the vesicles and the pore throats. As the size differential increases, for example, because of a permeability decrease or damage, the invasion of the vesicles into the formation is reduced. Conversely as the size differential decreases, for example, because of a permeability increase, the invasion into the formation increases. Once in place, the viscous pill formed by the diverting fluid in the formation will have a finite depth of invasion related to the pore throat diameter. Typically, for a given formation type, the invasion depth is directly proportional to the nominal pore throat diameter of the formation. As the fluid stops moving in the formation, the amount of injection pressure into this interval will also increase. At some point during injection, the pressure required to inject the stimulation fluid into this interval will exceed the pressure required to inject the stimulation fluid into other portions of the interval and diversion will be achieved.

The viscous pill may be placed across the entire formation. Varying depths of invasion will then occur throughout the formation based upon the varying permeability or damage throughout the interval. The ability of the viscoelastic fluid to invade into these pore throats will vary depending on the difference between pore throat sizing of the damaged and non-damaged formation materials. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the diverting pill may be placed in these intervals.

Figure 2:
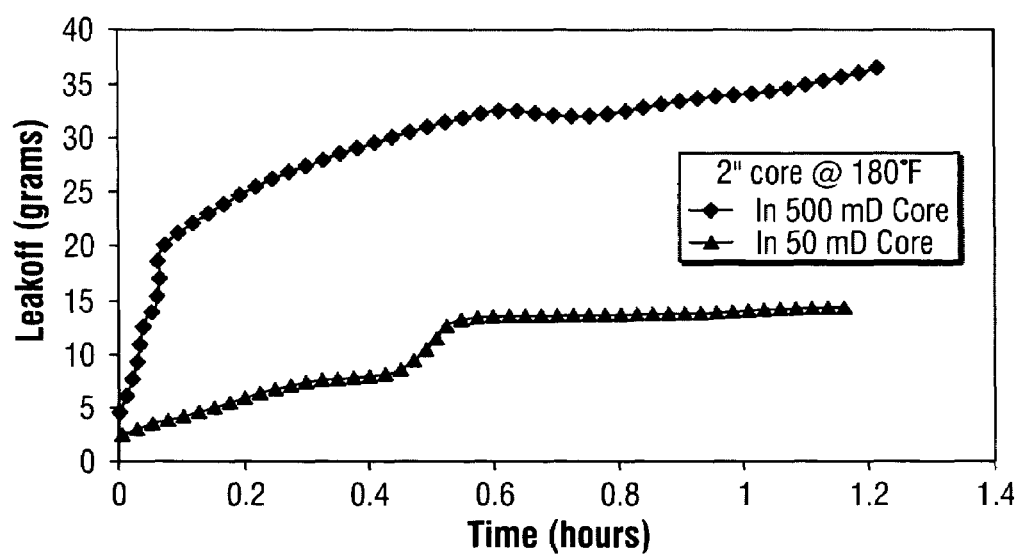
FIG. 2 demonstrates the leak-off or invasion permeabilities of the inventive viscoelastic surfactant fluids over time.

FIG. 2 demonstrates the leak-off rate of a viscoelastic fluid of the invention in a formation with differing permeabilities, specifically in a 2 inch core at 180° F. with permeabilities of 50 mD and 500 mD wherein the leak-off volume is represented by the y-axis and where mD is the unit for permeability. The fluid has a much higher leak-off in the high perm core (500 mD) (deeper invasion into the formation) than that in a low penn core (50 mD). The returned perm on the core flow tests were accessed by flowing the core with 3% KCl to obtain the permeability of the core, pushing the diverting fluid (as a pill) through the core to create the plug, flowing the core again with 3% KCl to obtain the returned permeability of the core, the "returned penn." If the second reading on the permeability is the same as the original value, the returned permeability is 100%. The results indicated 90% returned perm without breaker and 100% returned perm with the addition of internal breakers.

Thus, when the diverting fluid of the invention is pushed into a production zone with various permeabilities, the majority of the diverting fluid will enter into the high permeability or non-damaged zone and form a temporary "plug" or "viscous pill" while the lower permeability zone has little invasion. This temporary "viscous pill" causes a pressure increase and diverts the fluid to a lower permeability portion of the formation.

Conventionally, the "pill" is pumped behind the stimulation fluid and enters the same portion of the formation as the stimulation fluid. A temporary "bridge" is formed. The viscoelastic pill has varying depths of invasion based upon permeability or damage to the interval since the plug and the pill enter across the entire formation. The annulus pressure increases and the acid stage, following introduction of the diverter, directs the acid to other portions of the interval. The diverting fluid of invention may also have an internal breaker built into the system to insure that the fluid viscosity can be reduced after a period of time.

Throughout the treatment, as injection is continued and pressure decreases, due to the removal of damage in other portions of the interval or the loss of viscosity of the diverting pill, additional diverter stages may be pumped. By alternating the pumping of acid stimulation fluids and diverting fluids, the heterogeneous formation may be appropriately treated. A typical pumping schedule may be as follows:
1. Injecting an acid stimulation fluid package;
2. Optionally pumping a spacer fluid;
3. Injecting a viscoelastic surfactant diverting fluid;
4. Optionally, followed by pumping a spacer fluid; and
5. Repeat step 1 to 4 as necessary.

Figure 3:
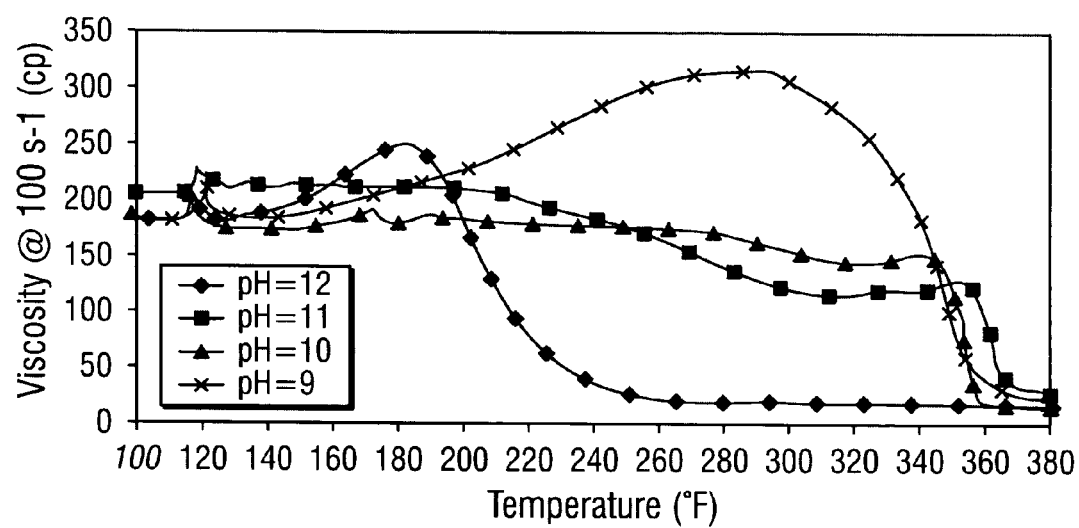
FIG. 3 shows the pH dependence of the fluid viscosity of the inventive viscoelastic surfactant fluids on temperature and pH.

The viscoelastic diverter fluid of the invention more readily loses its viscosity (and thus structure) at lower pH, as shown in FIG. 3. FIG. 3 is a graphical depiction illustrating the dependence of the viscosity of the diverting fluid of the invention on temperature and pH. Diverting fluid line 400 depicts the viscosity of the diverting fluid of one embodiment of the invention at a pH of 12.0, diverting fluid line 500 at a pH of 11.0, diverting fluid line 600 at a pH of 10.0 and diverting fluid line 700 at a pH of 9.0. The pH of the diverting fluid may be adjusted when desired. Typically, the pH is maintained at a value of between about 9.0 to about 11.0. The pH may be adjusted by any means known in the art, including the addition of acid or base to the fluid, or bubbling $CO_2$ through the fluid and the like.

Figure 4:
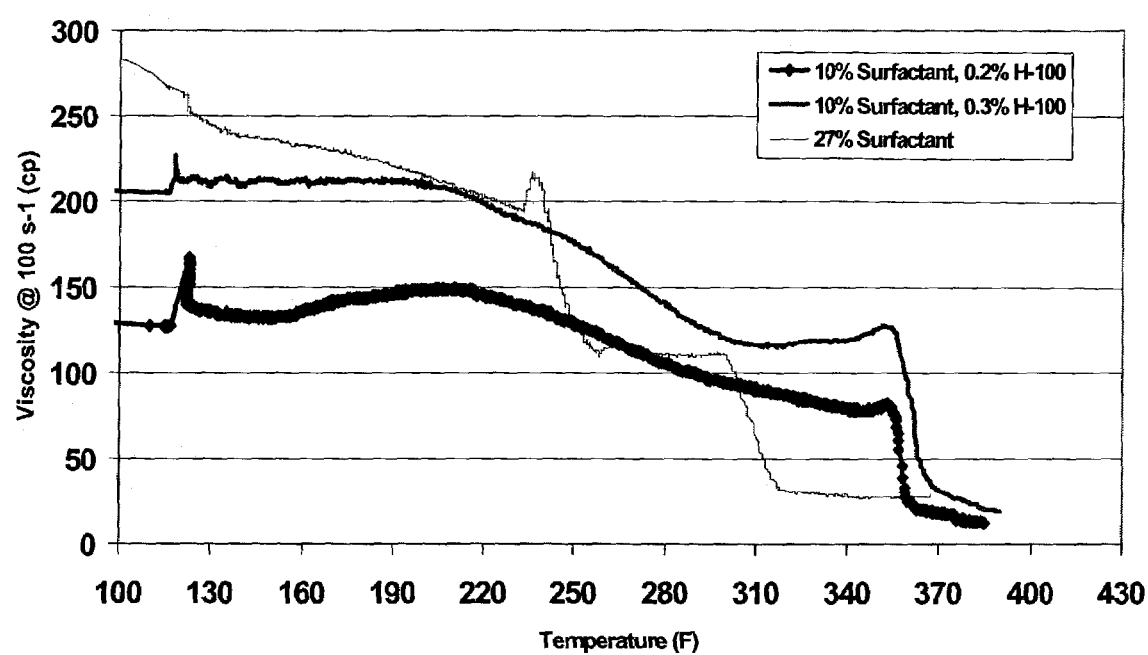
FIG. 4 shows the effect of temperature on the viscosity of the viscoelastic surfactant fluids of the invention.

The inventive viscoelastic diverter fluids further optionally include an internal breaker to ensure complete breaking at desired time intervals. Viscoelastic diverter fluids not containing polyquats typically lose viscosity upon dilution with water or mixing with hydrocarbons. A requisite amount of breaker, depending on the bottom hole temperature, may be added to the viscoelastic diverter fluids of the invention in order to ensure complete gel breaking in a desired time frame. The effect of temperature on viscosity in viscoelastic surfactant fluids of the invention versus those fluids containing no polyquat is illustrated in FIG. 4.

By controlling the time in which the acid-forming agent reduces the pH, the time required for the fluid to lose viscosity may be controlled, creating a fluid that can be broken at a desired time. The optional internal breaker therefore assists to ensure that, even without acid interaction, the viscous gel will be broken and will not leave residual damage to the higher permeability formation. Generally, after the diverting fluid is broken, the formation will return to the same viscosity as before the diverting fluid was applied.

The percentage of internal breaker in the diverting fluid will typically depend upon the type of internal breaker and the desired time for reducing the diverting fluid pH. The internal breaker may range from about 0.005 to about 10% of the total fluid, preferably 0.01–5%, most preferably 0.05–2%, all by weight, but may be higher or lower if desired. The combination of acid, temperature and internal breaker ensures that the diverter fluids of the invention will be broken during or after treatment. Such properties have particular applicability in both dry gas and oil bearing reservoirs.

The internal breaker may be an ester, an organic or inorganic acid, an anhydride, an acid halide, a polyglycolic acid or mixtures thereof. Examples of these include, but are not limited to, methyl formate, ethyl formate, propyl formate, butyl formate, methyl acetate, ethyl acetate, propyl acetate, butyl acetate, ethylene glycol monobutyl acetate, ethylene glycol diacetate, acetic anhydride, acetic formic anhydride, succinic anhydride, tetrachlorophthalic anhydride, chloro ethyl formate, chloro ethyl acetate, polyglycolic acid, ethylene glycol diacetate, ethylene glycol triacetate, and the like and mixtures thereof. The internal breaker may also be an oxidizer such as, but not limited to, persulfates, such as ammonia persulfate and sodium persulfate, and peroxidizers such as hydrogen peroxide. These compounds may also be used in combination when desired.

Figure 5:
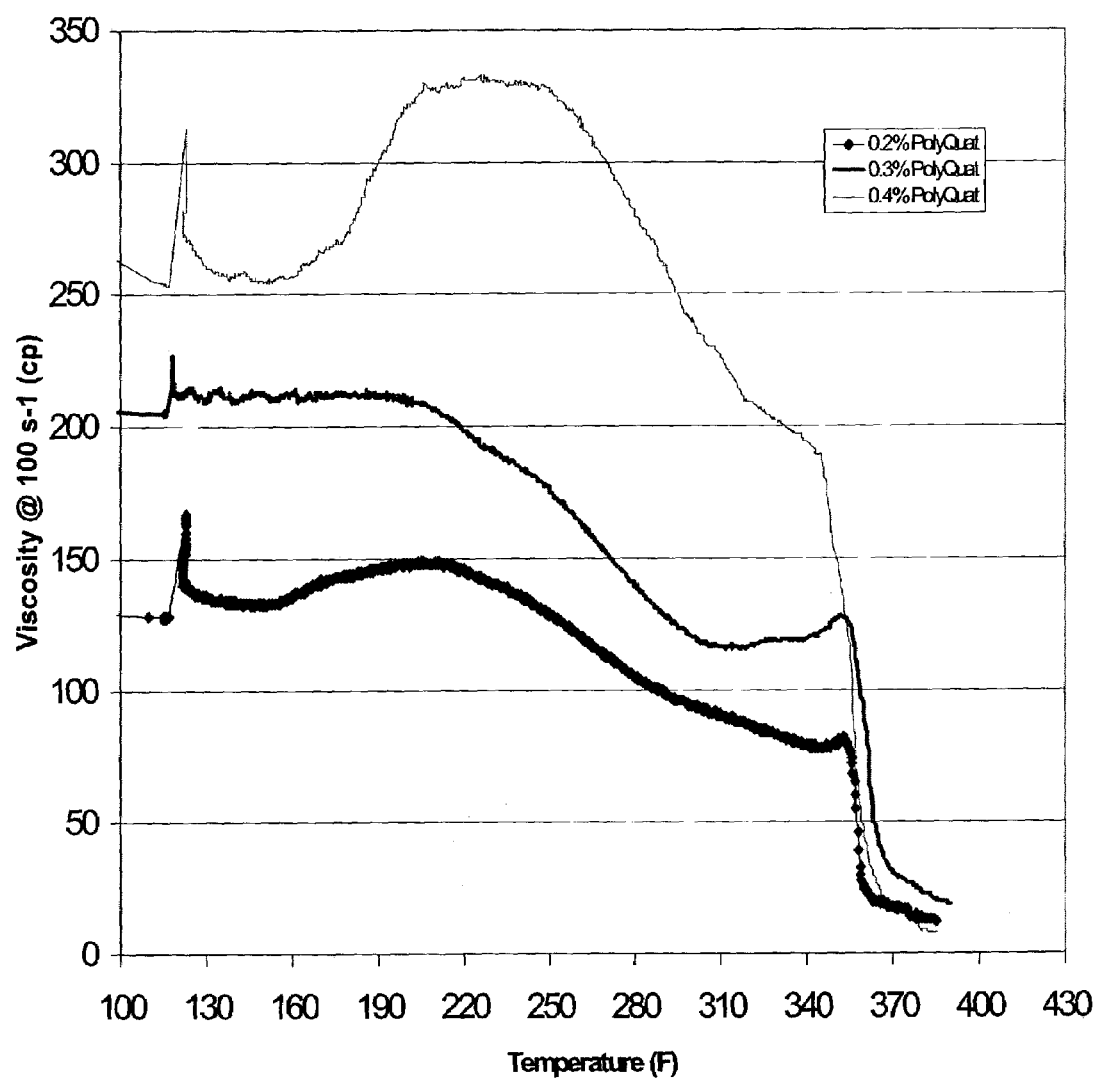
FIG. 5 compares the rheological data of the inventive viscoelastic surfactant fluids with varying amount of quaternary amine polyelectrolyte.

FIG. 5 compares the rheological data between viscoelastic fluids with varying amounts of polyquat. Specifically it demonstrates the change in viscosity at elevated temperatures of fluids containing 0.2 weight percent polyquat, 0.3 weight percent polyquat and no polyquat but an increased level of surfactant. The vesicle fluid having no polyquat exhibits the thermal stability at about 250° F. With the introduction of polyquat, it is possible to stabilize the viscoelastic fluid up to about 350° F. The positively charged polyquat has strong interaction with the surfactant molecules which thereby result in more stable vesicles. Compared to the vesicular fluid containing no polyquat, the vesicular structure of the invention containing a polyquat is larger and more diverse in size. This character is likely attributed to the interaction of the polyquat with surfactant molecules. This strong interaction makes it possible to have more and larger vesicles than the vesicle fluids containing surfactant only. As shown in FIG. 1, the vesicle structures of the invention have concentric rings and are typical of multilayered surfactant vesicles.

Figure 6:
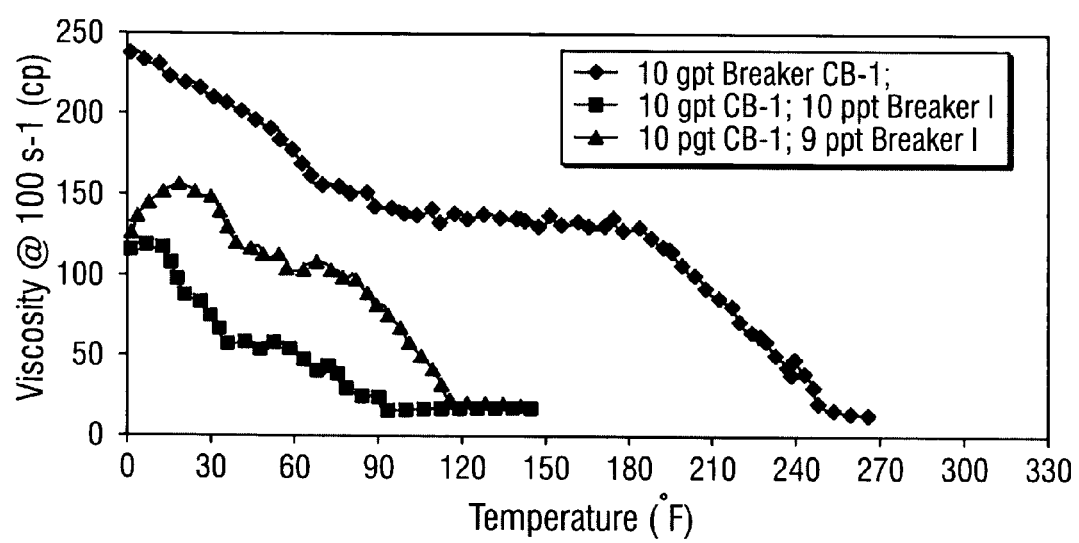
FIG. 6 demonstrates the effect of breaker loadings on the fluid viscosity of the viscoelastic diverting fluids of the invention.

The rheology of inventive vesicle fluid further depends on the loading of polyquat. As shown in FIG. 6, the vesicular fluid with polyquat as electrolyte has lower viscosity at lower temperatures than the vesicular fluid void of polyquat and having higher surfactant loading. When the loading of the polyquat reaches 0.3%, the fluid has similar viscosity at lower temperatures to that of the fluid without polyquat. At higher temperatures, the vesicular fluid with polyquat has significantly higher viscosity than the vesicular fluid void of polyquat. Thus, the vesicular fluid increases its viscosity as the loading of polyquat increases; however, the increment in loading of polyquat does not further enhance vesicular structure and viscosity.

The introduction of polyquat as electrolyte further reduces the minimum amount of surfactant required for vesicle formation. Before the addition of the electrolyte, almost 27% by volume surfactant loading is minimally required in order to generate adequate viscosity for oilfield applications. Upon the addition of electrolyte to 10 weight percent surfactant, gelation commences and the final viscosity of the vesicular fluid is dependent upon the loading of the quaternary amine electrolyte. This phenomena is further evident by observation of the vesicular fluid in FIG. 1. To generate the fluid viscosity seen in a vesicular fluid containing no polyquat, less surfactant is required as the number and size of vesicles in the fluid increase. The reduction in surfactant concentration further makes it possible to minimize the potential of emulsion formation. In fact, no emulsion has been observed in either laboratory or field usages of the inventive vesicular fluids.

The viscoelastic surfactant fluids of the invention are further sensitive to pH. As illustrated in FIG. 3, the inventive diverting fluids may lose structure and viscosity at low pH. This is particularly beneficial in applications of acid diverting since it ensures complete gel breaking during the acid pumping stage, leaving no damage to the high permeability zone. The pH of the fluid should preferably be above 9.0, preferably between about 9.0 and about 11.0.

The acid stimulation fluid may include an acid, corrosion inhibitor, demulsifier or non-emulsifier, mutual solvent, and other components known to those of skill in the art. Acids may include inorganic acids such as hydrofluoric, hydrobromic, hydrochloric, and $H_2CO_3$, and organic acids such as acetic acid, formic acid, and citric acid. Mutual solvents include such compounds as ethylene glycol, monobutyl ether, and dipropylene glycol methyl ether. The spacer fluid typically contains a salt solution such as NaCl, KCl and/or $NH_4Cl$.

Preferably, the injection pressure of the diverting fluid is less than the fracture pressure of the formation. This fracture pressure will depend upon the type of formation.

The final injection pressure of the spacer fluid or acid stimulation fluid will generally be lower than original injection pressure, demonstrating damage removal or stimulation of portions of the zone that were not included in the initial injection. If necessary, steps 1 to 4 may be repeated to improve the placement of stimulation fluids by monitoring the treating pressure, bottom hole pressure, or surface pressure reading.

A reduction in pH of the vesicle structured viscoelastic fluid will cause a reduction in the fluid viscosity. In most stimulations, a stage of acid is injected following the diverting stage. As the stimulation fluid enters the formation and comes in contact with the viscous pill, the acid or low pH fluid will reduce the pill's viscosity. As the viscosity of the pill is reduced, fluid enters that portion of the reservoir. Because the diverting fluid will most often have less penetration into the damaged or less permeable section of the formation, there is less diverting fluid in the damaged or less permeable section of the formation in a bulk sense. As a result, acid from a later acid treatment or resulting from the acid-forming compounds of an internal breaker will remove all or nearly all of the diverting agent from the damaged or less permeable section of the formation before that of the undamaged or more permeable section. This action allows penetration of the acid treatment in the damaged or less permeable section of the formation before that of the undamaged or more permeable section. The oxidizing agent type of internal breaker is believed to result in the same effect, but by a different mechanism of actually breaking up the surfactant chains of the vesicles. With less of the pill volume in the lower permeability zones, viscosity loss normally occurs more rapidly. As the viscosity of the pill is reduced, and with less volume in the damaged interval, the pressure restriction causing diversion is normally reduced and the stimulation fluid enters that area of the formation. This formation invasion profile is a reason for the successful diversion of the acid treatment.

The diverter fluids of the invention are easy to use and can be prepared on site or off-site.

EXAMPLES

The following examples will illustrate the practice of the present invention in a preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

Viscosity was measured by Fann50 rheometer. The pressure readings were recorded through field applications of the fluid. Examples 2 and 3 are studies resulting from the injection into an oil well in the Gulf of Mexico having a bottomhole temperature ranging between 150 and 200° F.

Example 1

Figure 9:
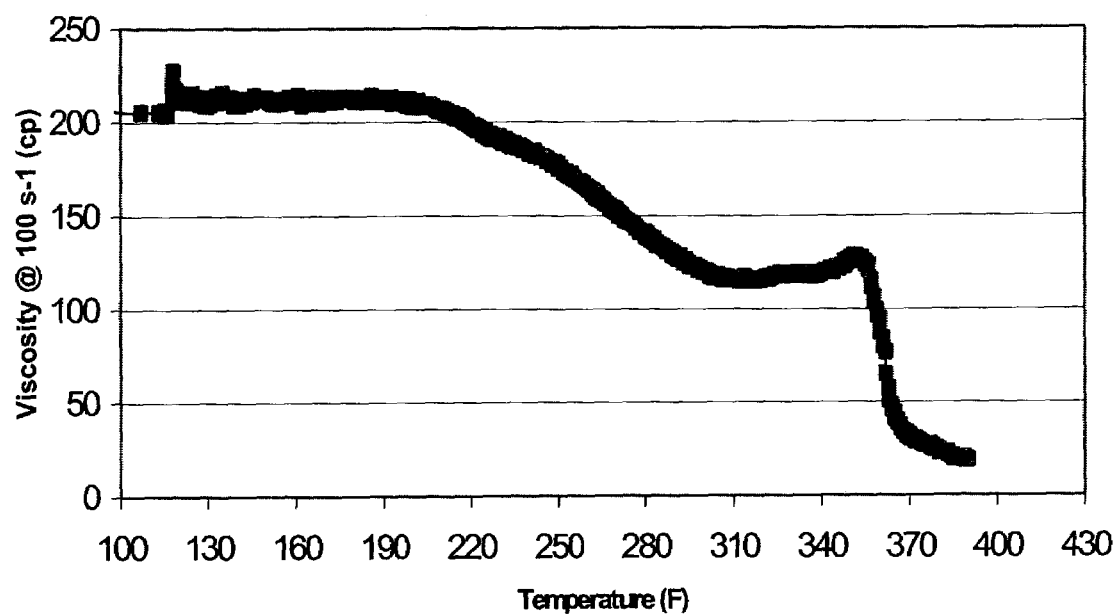
FIG. 9 demonstrates the Theological profile of the viscoelastic surfactant diverter pill made in Example 1.

A viscoelastic surfactant diverter pill was made by adding 90 ml of water to a Waring blender; adding 0.3 g of carboxymethyl cellulose containing a quaternary amine group (Celquat H-100, National Starch & Chemical) into the water; agitating the mixture for 30 minutes; adding 2.4 ml of ethylene glycol monobutyl ether while under agitation; adding 7.6 ml of lecithin (Riceland Chemical) and continue to agitation for another 10 minutes; adjusting fluid pH to 10.0 using 30% NaOH solution and continue to agitate the solution for another 10 minutes; pouring out the fluid and running a viscosity test on Fann 50. FIG. 9 is the rheological profile of the fluid at various temperatures.

Example 2

The viscoelastic surfactant diverter pill of Example 1 was used in a 53-foot oil-bearing reservoir at a measured depth of 14,500 feet. Bottomhole temperature in this interval was recorded at 198° F. and the interval was completed as a high rate water pack (HRWP). A 10% HCl −5% acetic acid treatment was injected in stages in front of the gravel to remove the damage and improve connection to the near-wellbore region. The acid treatment was separated into three stages to best treat the entire interval with two diverter pills.

Figure 7:
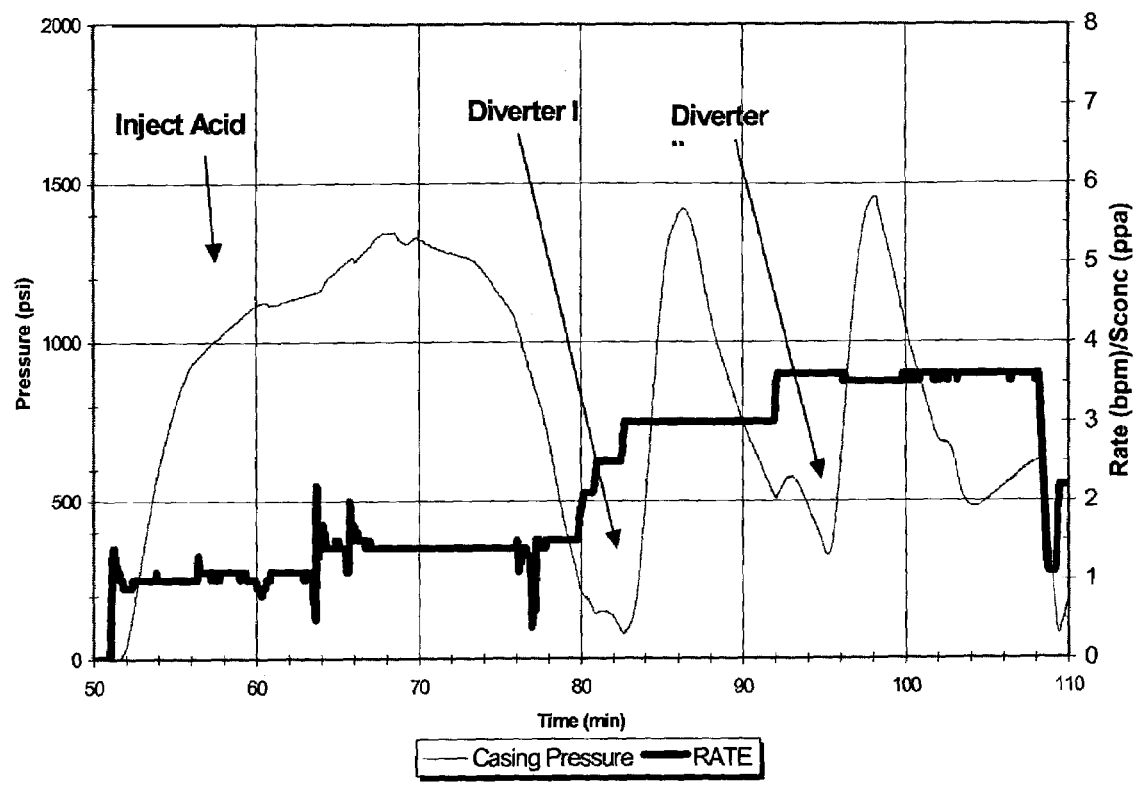
FIGS. 7 and 8 show the relationship of pressure and rate of introduction versus time of injection of acid and two diverting fluids for Examples 2 and 3, respectively.

After injecting the first HCl/acetic acid into the formation, the treating pressure on the annulus decreased from 1,300 psi to less than 250 psi at a rate of 1.5 bpm (See FIG. 7). The annulus pressure stabilized during treatment of the well with a 5% $NH_4Cl$ spacer fluid. The viscoelastic diverter pill (of Example 1) was injected into the well. Once the viscoelastic diverter pill reached the perforations, an increase of 1200 psi in annulus pressure was observed as the rate was held constant at 3 bpm. Most of this pressure increase can be associated with the diverter pill since the pumping rate was kept fairly stable.

Following the placement of the first diverter pill, a second stage of HCl/acetic acid treatment was injected into the formation at 3 bpm. Once the acetic acid/HCl entered the formation, the pressure decreased from 1300 psi to 400 psi on the annulus. The pressure response is indicative that the fluid entered the portion of the damaged or lower perm interval and clean-up of this portion of the perforated interval occurred.

As the second diverter pill was introduced into the formation, the annulus pressure increased from previous 400 psi up to 1400 psi over several minutes while the pumping rate was kept at 3.5 bpm. This pressure increase can be attributed to the viscosity effect of the viscoelastic diverter pill inside the porous formation. Following the introduction of the second diverter, the last stage of HCl/acetic acid was injected. Once this portion of the acid was on the formation, the annulus pressure dropped in several minutes. Although part of the acid enters the temporarily bridged zone, a good portion of the acid would be diverted into some portion of the reservoir unstimulated by the previous two stages of acid. This could be indicative of acid diversion and clean-up in a new portion of the perforated interval or indicative that the diverter pill had lost viscosity and the effective "bridging" or diversion.

The HRWP was pumped as designed with an annular screen-out occurring and the well was producing above expected production rates.

The pressure responses demonstrate that there is no injection restriction after the introduction of the diverter fluid followed by acid stimulation. Further, it indicates that no damage is caused by the diverter fluid. Additional pills can be added to the treatment to promote additional diversion, if necessary. No emulsion was formed in this Example.

Example 3

In this Example, the viscoelastic diverter pill of Example 1 was used in a 120 ft gross and 91 ft net oil reservoir at a measured depth of 9,600 feet. The well was not perfectly deviated by 41 degrees. The primary in a single selective, this zone was completed as a HRWP. The bottomhole temperature in this interval was recorded at 150° F. A 10% HCl acid solution was injected in front of the gravel to improve connection to the near-wellbore region. The acid treatment was separated into four stages with three viscoelastic diverter pills.

Figure 8:
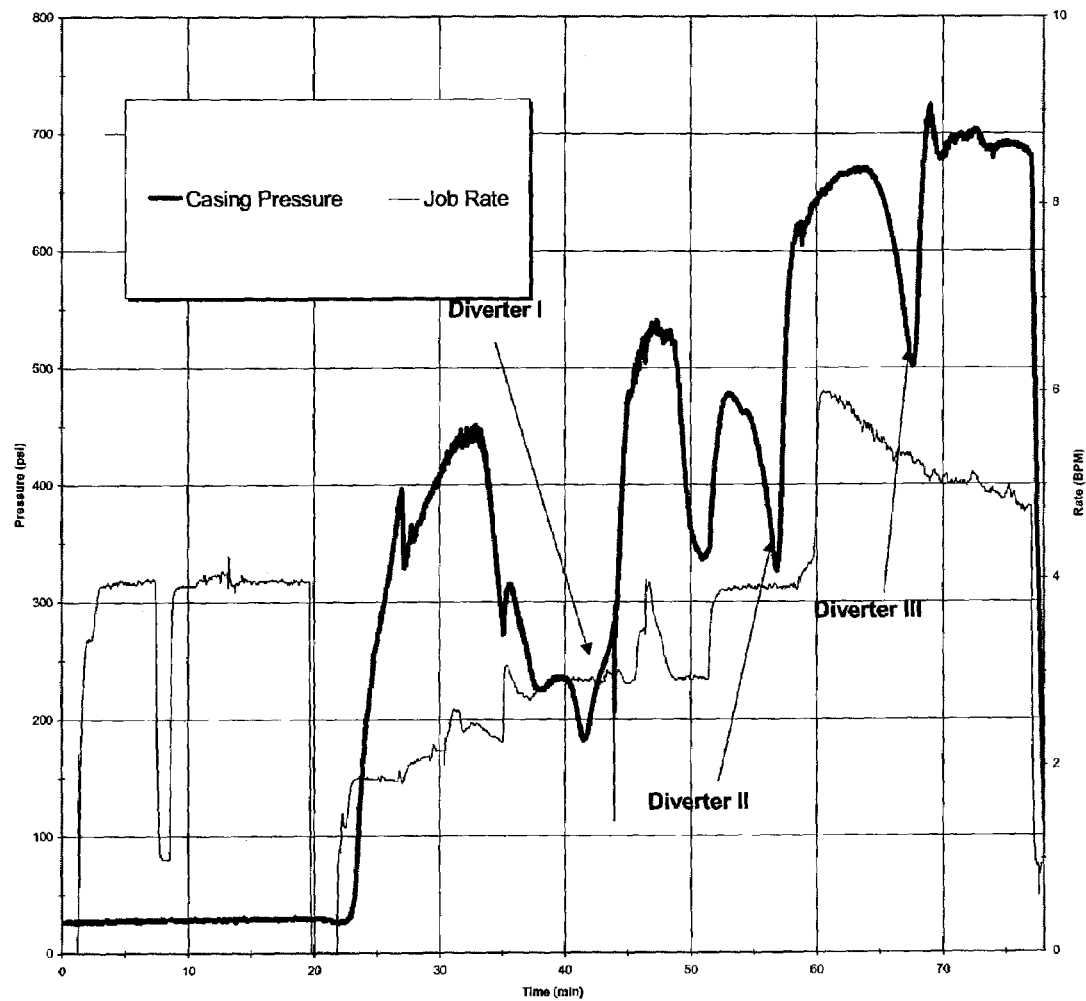

Once the first acetic-HCl acid stage reached formation, the treating pressure on the annulus decreased from 450 psi to 200 psi (See FIG. 8). As injection was continued with the HCl acid and the acid rate was increased from about 2 bpm to about 3.0 bpm, the annulus pressure continued to decrease. The (first) viscoelastic diverter pill was injected at the rate of 3.0 bpm and once the diverter pill reached the perforations, a 300 psi increase in annulus pressure was observed at a rate of about 3.0 bpm.

Following the placement of the first diverter pill, the second stage of treatment acid was injected into the formation at 3.0 bpm. A stabilized pressure injection profile was observed over the next 5 minutes as the second stage of 5% NH$_4$Cl spacer and HCl acids were injected into the formation. As the second stage of HCl entered the formation, the pressure decreased from 500 psi to about 300 psi on the annulus. The injection rate of the acid was increased to 3.75 bpm and the (second) diverter pill was injected.

Once the diverter reached formation, a 300 psi pressure increase was observed in the annulus. Following the second diverter, the third stage of HCl was injected at the rate of 6 bpm. There was a 5 minute period in which the annulus pressure stabilized at about 650 psi and then rapidly decreased to about 500 psi once the acid entered into the non-treated zone and break down of the formation occurred. (This could be indicative of acid diversion and clean-up in a new portion of the perforated interval or that the diverter pill had lost viscosity and the effective "bridging" or diversion.)

A third diverter pill was pumped and followed by the last stage of the acid treatment. A 200 psi pressure increase was observed in this stage of the diverter. Once the last stage of the acid entered the formation, 5% KCl was pumped to flush the formation and the step rate test was started. The HRWP was pumped as designed with an annular screen-out occurring and the well was producing above operator expectations.

The pressure responses demonstrate that there is no injection restriction after the introduction of the diverter fluid followed by acid stimulation. Further, it indicates that no damage is caused by the diverter fluid. Additional pills can be added to the treatment to promote additional diversion, if desired. No emulsion was formed in this Example.

Example 4

This Example is directed to a viscoelastic surfactant diverter pill having an internal breaker. The pill was made by adding 90 ml of water to a Waring blender; adding 0.3 g of carboxymethyl cellulose containing a quaternary amine group (Celquat H-100, National Starch & Chemical) into the water; agitating the mixture for 30 minutes; adding 2.4 ml of ethylene glycol monobutyl ether while under agitation; adding 7.6 ml of lecithin (Riceland Chemical) and continue to agitation for another 10 minutes; adjusting fluid pH to 10.0 using 30% NaOH solution and continue to agitate the solution for another 10 minutes; adding 0.1 ml of triethyl citrate and 0.0024 g of ammonium persulfate and continuing to agitate the mixture for about 5 minutes; pouring out the fluid and running a viscosity test on Fann 50. The resulting fluid has a viscosity above 50 cp @ 100 1/s at the temperature of 250° F.

From the foregoing, it will be observed that numerous variations and modifications may be effected without departing from the true spirit and scope of the novel concepts of the invention.

What is claimed is:

1. A viscoelastic fluid having a vesicle structure and comprising:
   (1) at least one amphoteric surfactant comprising lecithin, wherein the lecithin comprises phosphatidylcholine, phosphatidylethanolamine and phosphatidyllinositol, or mixtures thereof;
   (2) at least one quaternary amine polyelectrolyte;
   (3) water; and
   (4) a non-aqueous solvent.

2. The viscoelastic fluid of claim 1, wherein the at least one quaternary amine is capable of reacting with the at least one amphoteric surfactant.

3. The viscoelastic fluid of claim 1, wherein the polyelectrolyte is an ammonium salt of a cellulose ether, aminoalkyl cellulose, aminocarbamoyl cellulose, hydroxyalkylcellulose or botainized cellulose aminoamide.

4. The viscoelastic fluid of claim 3, wherein the at least one polyelectrolyte is of the general formula:

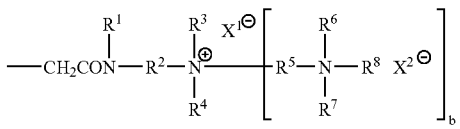

wherein b is between 2 and 8;
R¹ is hydrogen or methyl;
R² is a divalent alkylene group with 2 to 20 carbon atoms;
R³, R⁴, R⁶, R⁷ and R⁸ are independently selected from alkyl groups with 1 to 4 carbon atoms;
R⁵ is a substituted or unsubstituted divalent alkylene group with 2 to 5 carbon atoms; and
X¹ and X² are anions.

5. The viscaelastic fluid of claim 4, wherein b is 4 or 5.

6. The viscoelastic fluid of claim 4, wherein R¹ is hydrogen.

7. The viscoelastic fluid of claim 4, wherein R² is —CH₂—CH₂— or —CH₂—CH₂—CH₂—.

8. The viscoelastic fluid of claim 4, wherein each of R³, R⁴, R⁶, R⁷, and R⁸ are methyl.

9. The viscoelastic fluid of claim 4, wherein R⁵ is —CH₂—CH(OH)—CH₂—.

10. The viscoelastic fluid of claim 4, wherein X¹ and X² are independently selected from a halide, a sulfate ester group or a sulfonic acid group.

11. The viscoelastic fluid of claim 3, wherein the hydroxyalkylcellulose is hydroxyethylcellulose.

12. The viscoelastic fluid of claim 1, wherein the polyelectrolyte is a cellulose ether represented by the overall structural formula:

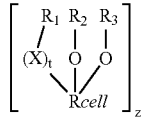

wherein:
R$_{cell}$ is the residue of an anhydroglucose repeat unit;
t is 0 or 1;
X is oxygen;
z is from 50 to about 20,000; and
each R₁, R₂ and R₃ is individually represented by the substituent structural formula:

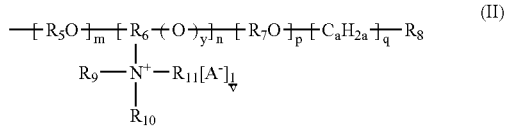

wherein:
A⁻ is an anion;
a is an integer of from 1 to about 3;
m is on integer of from 0 to about 6;
n is an integer greater than or equal to 0, provided that the level of cationic substitution, CS, defined by the average moles of quaternary nitrogen atoms per mole anhydroglucose repeat unit is greater than 0;
p is an integer of from 0 to about 6;
q is 0 or 1;

each R₅ and R₇ is individually ethylene, a propylene or a hydroxypropylene;
R₆ is a di- or trivalent, cyclic, branched or straight chain, saturated or unsaturated hydrocarbon having from 2 to about 6 carbon atoms, provided there are at least 2 carbon atoms between the nitrogen atom and any oxygen atom;
R₈ is hydrogen, hydroxyl, R$_h$, alkyl, carboxyl or alkali metal or amine carboxylate, or other terminal group provided that when q is 0 then R₈ is hydrogen or alkyl;
each R₉, R₁₀ and R₁₁ is individually R$_h$, alkyl, aryl, aralkyl, alkaryl, cycloalkyl, alkoxyaryl or alkoxyalkyl, having at least two carbon atoms separating the oxygen atom in the alkoxyaryl or alkoxyalkyl group from the nitrogen atom or together with R₆ forms a heterocyclic ring;
R$_h$ is a hydrophobic group containing an alkyl group having at least 8 carbon atoms;
v is equal to the valence of A;
y is 0 or 1, provided that when y is 0 then p and q are 0 and R₈ is hydrogen or other terminal group.

13. The viscoelastic fluid of claim 12, wherein the cellulose ether is polyquaternium-4.

14. The viscoelastic fluid of claim 1, wherein the water is fresh water or seawater.

15. The viscoelastic fluid of claim 1, wherein the fluid further comprises a salt.

16. The viscoelastic fluid of claim 15, wherein the salt is potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, or a mixture thereof.

17. The viscoelastic fluid of claim 15, wherein the amount of salt in the water is up to 60 weight percent of the water.

18. The viscoelastic fluid of claim 1, wherein the pH of the viscoelastic fluid is between from about 9.0 to about 11.0.

19. The viscoelastic fluid of claim 10, wherein X¹ and X² are each chloride.

20. The viscoelastic fluid of claim 1, wherein the fluid further comprises an internal breaker.

21. The viscoelastic fluid of claim 20, wherein the internal breaker is an acid-forming compound or oxidizer.

22. The viscoelastic fluid of claim 21, wherein the acid-forming compound comprises an organic acid, an inorganic acid, an ester, an anhydride, a polyglycolic acid, or a mixture thereof.

23. The viscoelastic fluid of claim 21, wherein the acid-forming compound comprises methyl formate, ethyl formate, propyl formate, butyl formate, methyl acetate, ethyl acetate, propyl acetate, butyl acetate, ethylene glycol monobutyl acetate, ethylene glycol diacetate, acetic anhydride, acetic formic anhydride, succinic anhydride, tetrachlorophthalic anhydride, chloroethyl formate, chloroethyl acetate, polyglycolic acid or a mixture thereof.

24. The viscoelastic fluid of claim 21, wherein the percentage of acid-forming compound or oxidizer present within the diverting fluid is between about 0.005 and about 10 percent, based on the weight of the fluid.

25. A method for injecting a diverting fluid into a formation, comprising:
(a.) providing a diverting fluid comprising vesicles; and
(b.) injecting the diverting fluid into the formation; and further wherein the diverting fluid comprises:
(1) at least one surfactant;

(2) at least one quaternary amine polyelectrolyte;
(3) water; and
(4) a non-aqueous solvent.

26. The method of claim 25, wherein the at least one quaternary amine polyelectrolyte is capable of reacting with the at least one surfactant.

27. The method of claim 26, wherein the polyelectrolyte is a derivative of carboxymethyl cellulose wherein at least one of the carboxymethyl groups are replaced by polyquaternary ammonium groups.

28. The method of claim 27, wherein the polyelectrolyte is of the formula:

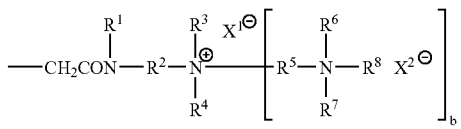

wherein b is between 2 and 8;
$R^1$ is hydrogen or methyl;
$R^2$ is an alkylene group with 2 to 20 carbon atoms;
$R^3$, $R^4$, $R^6$, $R^7$ and $R^8$ are alkyl groups with 1 to 4 carbon atoms that may be the same as one another or different from one another;
$R^5$ is a substituted or unsubstituted divalent alkylene group with 2 to 5 carbon atoms; and
$X^1$ and $X^2$ are independently selected from a halide, a sulfate ester group or a sulfonic acid group.

29. The method of claim 25, wherein the polyelectrolyte is a cellulose ether represented by the overall structural formula:

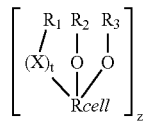

wherein:
$R_{cell}$ is the residue of an anhydroglucose repeat unit;
t is 0 or 1;
X is oxygen;
z is from 50 to about 20,000; and
each $R_1$, $R_2$ and $R_3$ is individually represented by the substituent structural formula:

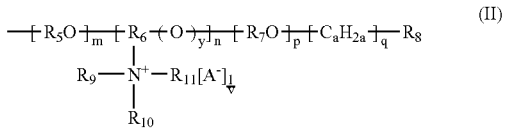

wherein:
$A^-$ is an anion;
a is an integer of from 1 to about 3;
m is an integer of from 0 to about 6;
n is an integer greater than or equal to 0, provided that the level of cationic substitution, CS, defined by the average moles of quaternary nitrogen atoms per mole anhydroglucose repeat unit is greater than 0;
p is an integer of from 0 to about 6;
q is 0 or 1;

each $R_5$ and $R_7$ is individually ethylene, a propylene or a hydroxypropylene;
$R_6$ is a di- or trivalent, cyclic, branched or straight chain, saturated or unsaturated hydrocarbon having from 2 to about 6 carbon atoms, provided there are at least 2 carbon atoms between the nitrogen atom and any oxygen atom;
$R_8$ is hydrogen, hydroxyl, $R_h$, alkyl, carboxyl or alkali metal or amine carboxylate, or other terminal group provided that when q is 0 then $R_8$ is hydrogen or alkyl;
each $R_9$, $R_{10}$, and $R_{11}$, is individually $R_h$, alkyl, aryl, aralkyl, alkaryl, cycloalkyl, alkoxyaryl or alkoxyalkyl, having at least two carbon atoms separating the oxygen atom in the alkoxyaryl or alkoxyalkyl group from the nitrogen atom or together with $R_6$ forms a heterocyclic ring;
$R_h$ is a hydrophobic group containing an alkyl group having at least 8 carbon atoms;
v is equal to the valence of A;
y is 0 or 1, provided that when y is 0 then p and q are 0 and $R_8$ is hydrogen or other terminal group.

30. The method of claim 29, wherein the cellulose ether is polyquaternium-4.

31. The method of claim 25, wherein the vesicles have a diameter of between about 100 Å and about 50 microns.

32. The method of claim 31, wherein the vesicles are unilamellar, multilamellar, or both.

33. The method of claim 25, wherein the non-aqueous solvent comprises an alcohol, and further wherein the alcohol is linear, branched, or cyclic.

34. The method of claim 25, wherein the diverting fluid further comprises an internal breaker.

35. The method of claim 34, wherein the internal breaker is an acid-forming compound or oxidizer.

36. The method of claim 35, wherein the internal breaker comprises an acid-forming compound and wherein the acid-forming compound comprises an organic acid, an inorganic acid, an ester, an anhydride, an acid halide, a polyglycolic acid, or a mixture thereof.

37. The method of claim 35, wherein the acid-forming compound comprises methyl formate, ethyl formate, propyl formate, butyl formate, methyl acetate, ethyl acetate, propyl acetate, butyl acetate, ethylene glycol monobutyl acetate, ethylene glycol diacetate, acetic anhydride, acetic forming anhydride, succinic anhydride, tetrachlorophthalic anhydride, chloroethyl formate; chloroethyl acetate, polyglycolic acid or a mixture thereof.

38. The method of claim 35, wherein the percentage of acid-forming compound present within the diverting fluid is between about 0.005 and about 10 percent, based on the weight of the fluid.

39. The method of claim 35, wherein the oxidizer comprises a peroxide or a persulfate.

40. A method for enhancing the productivity of a hydrocarbon-bearing formation comprising pumping into the formation the viscoelastic fluid of claim 1.

41. The method of claim 40, wherein the polyelectrolyte is a cellulose ether represented by the overall structural formula:

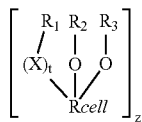

wherein:
R<sub>cell</sub> is the residue of an anhydroglucose repeat unit;
t is 0 or 1;
X is oxygen;
z is from 50 to about 20,000; and
each $R_1$, $R_2$ and $R_3$ is individually represented by the substituent structural formula:

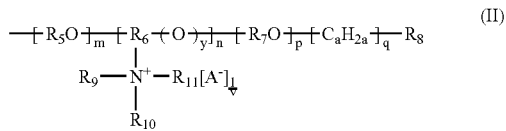

(II)

wherein:
$A^-$ is an anion;
a is an integer of from 1 to about 3;
m is an integer of from 0 to about 6.
n is an integer greater than or equal to 0, provided that the level of cationic substitution, CS, defined by the average moles of quaternary nitrogen atoms per mole anhydroglucose repeat unit is greater than 0;
p is an integer of from 0 to about 6;
q is 0 or 1;
each $R_5$ and $R_7$ is individually ethylene, a propylene or a hydroxypropylene;
$R_6$ is a di- or trivalent, cyclic, branched or straight chain, saturated or unsaturated hydrocarbon having from 2 to about 6 carbon atoms, provided there are at least 2 carbon atoms between the nitrogen atom and any oxygen atom;
$R_8$ is hydrogen, hydroxyl, $R_h$, alkyl, carboxyl or alkali metal or amine carboxylate, or other terminal group provided that when q is 0 then $R_8$ is hydrogen or alkyl;
each $R_9$, $R_{10}$ and $R_{11}$ is individually $R_h$, alkyl, aryl, aralkyl, alkaryl, cycloalkyl, alkoxyaryl or alkoxyalkyl, having at least two carbon atoms separating the oxygen atom in the alkoxyaryl or alkoxyalkyl group from the nitrogen atom or together with $R_6$ forms a heterocyclic ring;
$R_h$ is a hydrophobic group containing an alkyl group having at least 8 carbon atoms;
v is equal to the valence of A;
y is 0 or 1, provided that when y is 0 then p and q are 0 and $R_8$ is hydrogen or other terminal group.

42. The method of claim 41, wherein the cellulose ether is polyquaternium-4.

43. A viscoelastic fluid having a vesicle structure and comprising:
(1) at least one amphoteric surfactant which comprises a chemically or enzymatically modified lecithin;
(2) at least one quaternary amine polyelectrolyte;
(3) water; and
(4) a non-aqueous solvent.

44. The viscoelastic fluid of claim 43, wherein the at least one quaternary amine is capable of reacting with the at least one amphoteric surfactant.

45. The viscoelastic fluid of claim 43, wherein the polyelectrolyte is an ammonium salt of a cellulose ether, aminoalkyl cellulose, aminocarbamoyl cellulose, hydroxyalkylcellulose or betainized cellulose aminoamide.

46. The viscaelastic fluid of claim 45, wherein the polyelectrolyte is a cellulose ether represented by the overall structural formula:

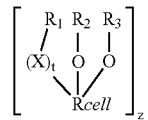

wherein:
R<sub>cell</sub> is the residue of an anhydroglucose repeat unit;
t is 0 or 1;
X is oxygen;
z is from 50 to about 20,000; and
each $R_1$, $R_2$ and $R_3$ is individually represented by the substituent structural formula:

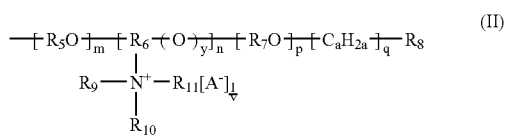

(II)

wherein:
$A^-$ is an anion;
a is an integer of from 1 to about 3;
m is an integer of from 0 to about 6;
n is an integer greater than or equal to 0, provided that the level of cationic substitution, CS, defined by the avenge moles of quaternary nitrogen atoms per mole anhydroglucose repeat unit is greater than 0;
p is an integer of from 0 to about 6;
q is 0 or 1;
each $R_5$ and $R_7$ is individually ethylene, a propylene or a hydroxypropylene;
$R_6$ is a di- or trivalent, cyclic, branched or straight chain, saturated or unsaturated hydrocarbon having from 2 to about 6 carbon atoms, provided there are at least 2 carbon atoms between the nitrogen atom and any oxygen atom;
$R_8$ is hydrogen, hydroxyl, $R_h$, alkyl, carboxyl or alkali metal or amine carboxylate, or other terminal group provided that when q is 0 then $R_8$ is hydrogen or alkyl;
each $R_9$, $R_{10}$ and $R_{11}$ is individually $R_h$, alkyl, aryl, aralkyl, alkaryl, cycloalkyl, alkoxyaryl ox alkoxyalkyl, having at least two carbon atoms separating the oxygen atom in the alkoxyaryl or alkoxyalkyl group from the nitrogen atom or together with $R_6$ forms a heterocyclic ring;
$R_h$ is a hydrophobic group containing an alkyl group having at least 8 carbon atoms;
v is equal to the valence of A;
y is 0 or 1, provided that when y is 0 then p and q are 0 and $R_8$ is hydrogen or other terminal group.

47. The viscoelastic fluid of claim 43, wherein the fluid further comprises an internal breaker.

* * * * *

UNITED STATES PATENT AND TRADEMARK OFFICE
CERTIFICATE OF CORRECTION

PATENT NO.       : 7,115,546 B2
APPLICATION NO.  : 10/356210
DATED            : October 3, 2006
INVENTOR(S)      : Qu et al.

It is certified that error appears in the above-identified patent and that said Letters Patent is hereby corrected as shown below:

Column 16, Line 65, replace "botainized" with "betainized"

Column 17, Lines 1-7, replace "

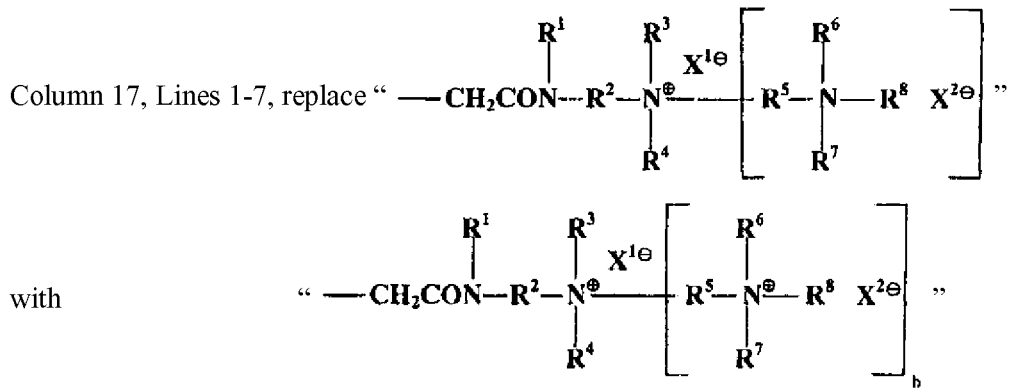

with "

Column 17, Line 17, replace "viscaclastic" with "viscoelastic"

Column 17, Line 61, replace "on" with "an"

Column 18, Line 21, replace "R ₈" with "R₈"

Column 18, Lines 54-55, replace "an hydride" with "anhydride"

Column 19, Lines 15-20, replace "

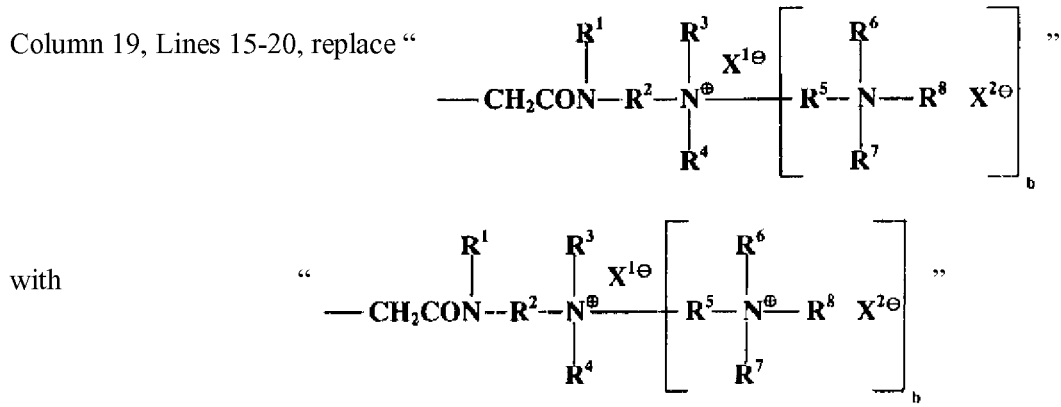

with "

UNITED STATES PATENT AND TRADEMARK OFFICE
CERTIFICATE OF CORRECTION

PATENT NO. : 7,115,546 B2
APPLICATION NO. : 10/356210
DATED : October 3, 2006
INVENTOR(S) : Qu et al.

It is certified that error appears in the above-identified patent and that said Letters Patent is hereby corrected as shown below:

Column 22, Line 5, replace "viscaclastic" with "viscoelastic"

Column 22, Line 37, replace "avenge" with "average"

Column 22, Line 53, replace "ox" with "or"

Signed and Sealed this

Ninth Day of June, 2009

JOHN DOLL
*Acting Director of the United States Patent and Trademark Office*